United States Patent
Richmond

(10) Patent No.: US 6,912,474 B2
(45) Date of Patent: *Jun. 28, 2005

(54) METHOD AND APPARATUS FOR HIGH-SPEED SYNCHRONOUS DIGITAL ACQUISITION DERIVED IN REAL-TIME FROM ANALOG SAMPLES

(75) Inventor: Gary K. Richmond, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/600,235

(22) Filed: Jun. 19, 2003

(65) Prior Publication Data

US 2004/0260493 A1 Dec. 23, 2004

(51) Int. Cl.[7] .............................................. G06F 19/00
(52) U.S. Cl. ........................ 702/125; 702/66; 702/74; 702/89; 702/125; 702/126; 702/189; 369/47.35; 369/59.21; 714/39; 708/307; 708/321; 379/406.15
(58) Field of Search .............................. 702/57, 66, 74, 702/89, 126, 182, 189; 369/47.35, 47; 714/39, 41; 708/307, 321; 379/406.15

(56) References Cited

U.S. PATENT DOCUMENTS

| | | | |
|---|---|---|---|
| 4,168,485 A | * | 9/1979 | Payton et al. .................. 367/41 |
| 4,204,433 A | * | 5/1980 | Cribbs et al. .................. 73/620 |
| 4,271,488 A | | 6/1981 | Saxe |
| 4,302,843 A | * | 11/1981 | Bauernfeind et al. ....... 375/224 |
| 4,349,896 A | * | 9/1982 | Hall, Jr. ........................ 367/26 |
| 4,598,398 A | * | 7/1986 | Doggett ....................... 370/241 |
| 5,521,599 A | | 5/1996 | McCarroll et al. |
| 5,526,286 A | | 6/1996 | Sauerwein et al. |
| 5,526,301 A | | 6/1996 | Saxe |
| 5,854,996 A | | 12/1998 | Overhage et al. |
| 2004/0081256 A1 | * | 4/2004 | Shi et al. .................... 375/317 |

OTHER PUBLICATIONS

Jundi et al., 'Sampled Data Analog Signal Processor', 1990, IEEE Article, pp. 64–66.*
Bosnjakovic et al., 'Uniform Sampling of Periodic Signals Using Successive Conversions', Feb. 1998, IEEE Article, vol. 47, No. 1, pp.: 56–60.*
Cheever, 'Convolution', Swarthmore College, PA, Date of Publication: Unknown, pp. 1–10.*
Meditch et al., 'On the Real–Time Control of Time Varying Linear Systems', Jul. 1962, IRE, pp. 3–10.*
Lewis, 'Optimizing the Stage Resolution in Pipelined, Mutistage, Analog–to–Digital Converters for Video–Rate Applications', Aug. 1992, IEEE, pp. 516–523.*

* cited by examiner

Primary Examiner—Marc S. Hoff
Assistant Examiner—Elias Desta
(74) Attorney, Agent, or Firm—Moser, Patterson, Sheridan, LLP; Francis I. Gray

(57) ABSTRACT

A method and apparatus for real-time derivation of precise digital clock edges and synchronous logic samples from a digital signal having a clock channel and at least one data channel acquires a plurality of temporally offset analog samples during each of a sequence of sample periods and from consecutive samples where there is a logic level transition estimates an edge time. From the edge times for the clock channel an offset is added and applied to the at least one data channel to determine the synchronous logic samples for the data channel at each offset clock edge time.

21 Claims, 10 Drawing Sheets

SAMPLE POINT DETECTION—ALL CHANNELS

| | CLOCK CHANNEL<br>CLOCK# EDGE BINS | SAMPLE POINT<br>CLOCK#<br>(CLOCK EDGE BIN–OFFSET) | SAMPLE POINT<br>BINS VALUE | DATA CHANNEL<br>CLOCK# EDGE BINS | VALUE |
|---|---|---|---|---|---|
| B₀ → | ooo00 1110 1100 | ooo00 1101 1100 | 0 | ooo00 1110 0111 | 1 → Bₐ |
| B₁ → | ooo01 0001 1001 | ooo01 0000 1001 | 1 | ooo01 0001 1100 | 0 → B_B |
| B₂ → | ooo01 0100 0100 | ooo01 0011 0100 | 0 | ooo01 0011 0100 | 1 → B_C |
| B₃ → | ooo01 0111 0100 | ooo01 0110 0100 | 1 | ooo01 1010 0101 | 0 → B_D |
| B₄ → | ooo01 1010 0000 | ooo01 1001 0000 | 1 | ooo01 1101 0011 | 1 → B_E |
| B₅ → | ooo01 1100 1000 | ooo01 0011 1000 | 0 | | |
| B₆ → | ooo01 1111 0011 | ooo01 1110 0011 | 1 | | |
| B₇ → | ooo10 0001 0000 | ooo10 0000 0000 | 1 | ooo10 0010 1100 | 0 → B_F |
| B₈ → | ooo10 1000 1100 | ooo10 0111 1100 | 0 | ooo10 0101 0111 | 1 → B_G |

STORE

SAMPLE POINT IS 100 ps BEFORE CLOCK EDGE
(SAMPLE POINT BIN = CLOCK EDGE BIN–0001 0000)

FIG. 10

METHOD AND APPARATUS FOR HIGH-SPEED SYNCHRONOUS DIGITAL ACQUISITION DERIVED IN REAL-TIME FROM ANALOG SAMPLES

FIELD OF THE INVENTION

The invention relates generally to digital data acquisition instruments such as logic analyzers and, more particularly, methods and apparatus supporting very high speed acquisition of logic level data.

BACKGROUND OF THE INVENTION

Logic analyzers are digital data acquisition instruments that allow a user to acquire and analyze digital data from a large number of logic signals, such as all of the address, data and control signals associated with a microprocessor. Each logic signal is compared to a logic threshold or thresholds and results in one of two logic states; namely, high or low, one or zero, true or false. The behavior of groups of these signals can then be monitored to analyze the behavior of the circuitry or instrument under test.

U.S. Pat. No 5,526,286, issued Jun. 11, 1996, to Sauerwein et al. for "Oversampled Logic Analyzer" discloses a digital oversampling system and is incorporated herein by reference in its entirety. In the disclosed oversampled logic analyzer, all data and clock signal inputs are acquired asynchronously at high speed using a digital fast-in slow-out (FISO) acquisition circuit which produces a plurality of parallel high-speed data samples within each cycle of an internal system clock. The sample interval utilized is greater than the setup-and-hold time of the sampling device. In the disclosed oversampled logic analyzer, various mechanisms are described that ensure that, the resulting samples are monotonic and statistically independent.

Unfortunately, practical ratios of oversampling limit the resolution of edge detection to a resolution that is too coarse to support the small setup and hold windows required by synchronous buses whose clock rate is significantly faster than the logic clock of the oversampled logic analyzer. Moreover, the described oversampled logic analyzer cannot detect more than one clock edge and store more than one related data sample per channel for each logic clock. Because it rejects any clock edges that occur within one logic clock period of any previously detected edge, its maximum synchronous rate is asymptotically limited to be less than the logic clock rate used.

Some of the above deficiencies were addressed in U.S. Pat. No 5,854,996, issued Dec. 29, 1998 to Overhage et al. for "LOGIC SIGNAL EXTRACTION," which patent application is incorporated herein by reference in its entirety. The Overhage arrangement addresses the edge resolution problem by storing the data as multi-bit analog samples and applying the Nyquist sampling theorem to interpolate the threshold crossing points of each signal to a much finer time resolution than the sample interval itself. Overhage discloses a method of precisely placing the data sample point relative to that edge by applying a mathematic time offset. In this manner, the logic clock limitation is avoided, since there is no real-time logic. That is, all the threshold comparison, edge detection and logic sampling is performed after the acquisition by processing the analog samples in a post processing manner via software.

Unfortunately, this approach is limited as a synchronous logic analyzer because: (1) the memory depths that can be practically implemented with analog sampling are several orders of magnitude smaller than logic analyzer implementations achieved and are effectively even shorter because many analog samples are necessary for each data clock period in order to achieve adequate edge placement accuracy; (2) using post-acquisition processing to derive state samples does not allow any inherent mechanism for the type of real-time complex logic triggering and storage qualification of the synchronous clocked data that logic analyzers provide; and (3) it is more difficult to achieve the channel densities required by logic state analyzer applications using analog sampling than it is using pure digital sampling.

SUMMARY OF INVENTION

These and other deficiencies of the prior art are addressed by the present invention of a method and apparatus for real-time derivation of precise digital clock edges and synchronous logic samples from multi-bit analog samples. Specifically, according to methods and apparatus of the present invention, a digital input signal is sampled at a very high rate with an analog sample-and-hold array. These analog samples are then analyzed in real-time by an array of signal processing elements referred to as real-time Nyquist engine (RTNE) slices that produce digital information which gets processed further by digital logic to derive the precise time of all clock edges crossing the selected threshold and the logic state of all data channels at a desired point in time (i.e., the sample point) relative to each clock edge. The resulting set of time stamps and data values are evaluated by other logic to provide complex triggering or other functions, and are stored in a digital memory in a similar fashion to traditional logic analyzers. Moreover, since the RTNE slices and the digital logic both operate at a clock rate much slower than the analog sample rate, and since several time stamps and logic samples can be stored on each logic clock, an effective synchronous clock rate is achieved that is many times faster than the logic clock rate used.

BRIEF DESCRIPTION OF THE DRAWINGS

The teachings of the present invention can be readily understood by considering the following detailed description in conjunction with the accompanying drawings, in which:

FIGS. 6–10 depict graphical representations useful in understanding the present invention.

To facilitate understanding, identical reference numerals have been used, where possible, to designate identical elements that are common to the figures.

DETAILED DESCRIPTION OF THE INVENTION

The subject invention will be primarily described within the context of a logic analyzer (LA). However, it will be appreciated by those skilled in the art that the invention may be advantageously employed in any single-channel or multiple-channel signal measurement or analysis device, such as a digital storage oscilloscope (DSO) in which one or more digital input signals are periodically sampled to ascertain changes in logic level over time.

The invention provides apparatus and method for sampling digital data at an extremely high effective sample rate. The subject invention acquires multiple samples during each sample clock period to identify one or more changes in logic state, as well as temporal offsets associated with each change. In this manner, multiple edges may be detected during each sample clock period.

Figure 1:
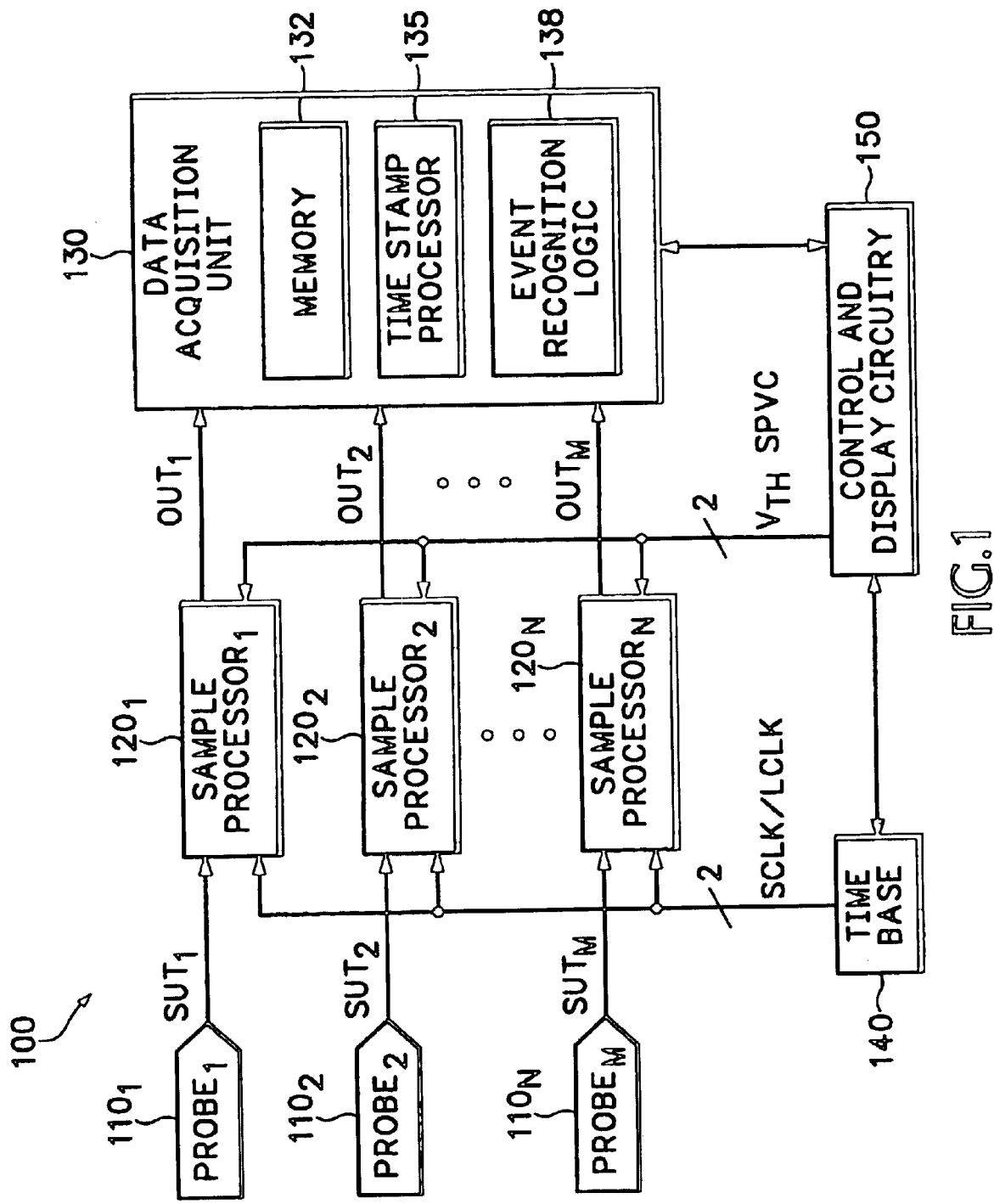
FIG. 1 depicts a high level block diagram of a logic analyzer according to an embodiment of the present invention.

FIG. 1 depicts a high level block diagram of a logic analyzer according to an embodiment of the present invention. Specifically, each of a plurality of probes $110_1$ through $110_M$ (collectively probes 110) provides a respective signal under test ($SUT_1$ through $SUT_M$) to a respective sample processor 120. Each of the sample processors $120_1$ through $120_M$ (collectively sample processors 120) processes its respective SUT in response to a logic clock LCLK and a threshold voltage level $V_{TH}$ to produce a corresponding output data stream OUT. Each of the plurality of output data streams $OUT_1$ through $OUT_M$ (collectively output data streams OUT) are coupled to an acquisition unit 130. The time base 140 is used to provide the sample clock signal SCLK and logic clock signal LCLK to the various components in the system.

The acquisition unit 130 includes memory 132, a time stamp processor 135, event recognition logic 138 and other circuitry adapted to receiving and processing the data streams OUT provided by the sample processors 120. Within the context of the present invention, the sample processors 120 are preferably implemented as discussed in more detail below with respect to FIG. 2.

The control and display circuitry 150 generates the voltage threshold signal $V_{TH}$ and a sample point violation control signal SPVC used by the sample processors 120, controls the time base 140, interacts with the acquisition unit 130 and otherwise provides input processing, output processing, display processing and control processing to and for the various components of the logic analyzer 100 of FIG. 1. It will be appreciated by those skilled in the art that various known portions used to implement the logic analyzer 100 have been omitted to avoid distracting the reader from the present invention.

The control and display processing circuitry 150 includes memory, input/output (I/O), processing and other circuitry suitable for storing and executing software routines in accordance with the present invention. Moreover, the control and display circuitry 150 interfaces to input devices (not shown) such as keyboards, tracking devices, computer interfaces and the like, as well as output devices such as display devices, interface devices and the like. Generally speaking, the control and display circuitry 150 implements computer-like functionality suitable for managing the various functions within the logic analyzer 100 of FIG. 1.

In the logic analyzer 100 of FIG. 1, it is assumed that one or more of the probes 110 is used to process a clock signal that is related to data signals processed by other probes. For example, assuming that M=100 (i.e., a 100 channel logic analyzer), one or more of the probes 110 may be used to sample a clock signal associated with a device or system being tested. Thus, in the below description of the invention, the term "clock channel" refers to an input channel of the logic analyzer 100 of FIG. 1 used to monitor the logic state of a clock signal, while the term "data channel" refers to an input channel of the logic analyzer 100 of FIG. 1 used to monitor the logic state of a data signal associated with the monitored clock signal. It will be appreciated by those skilled in the art informed by the teachings of the present invention that multiple clock channels may be employed, that various combinations of clock and data channels may be monitored and the like.

As will be discussed in more detail below with respect to FIGS. 2 and 3, the data derived from the "clock channel" is used to perform various functions within the context of the sample processors 120. Specifically, the data from the clock channel is time stamped using a time stamp processor within the data acquisition unit 130, and also used as a clock source by sample point and violation detection logic within the sample processors 120 to determine whether various temporal-related trigger conditions have occurred with respect to the sampled data streams.

Figure 2:
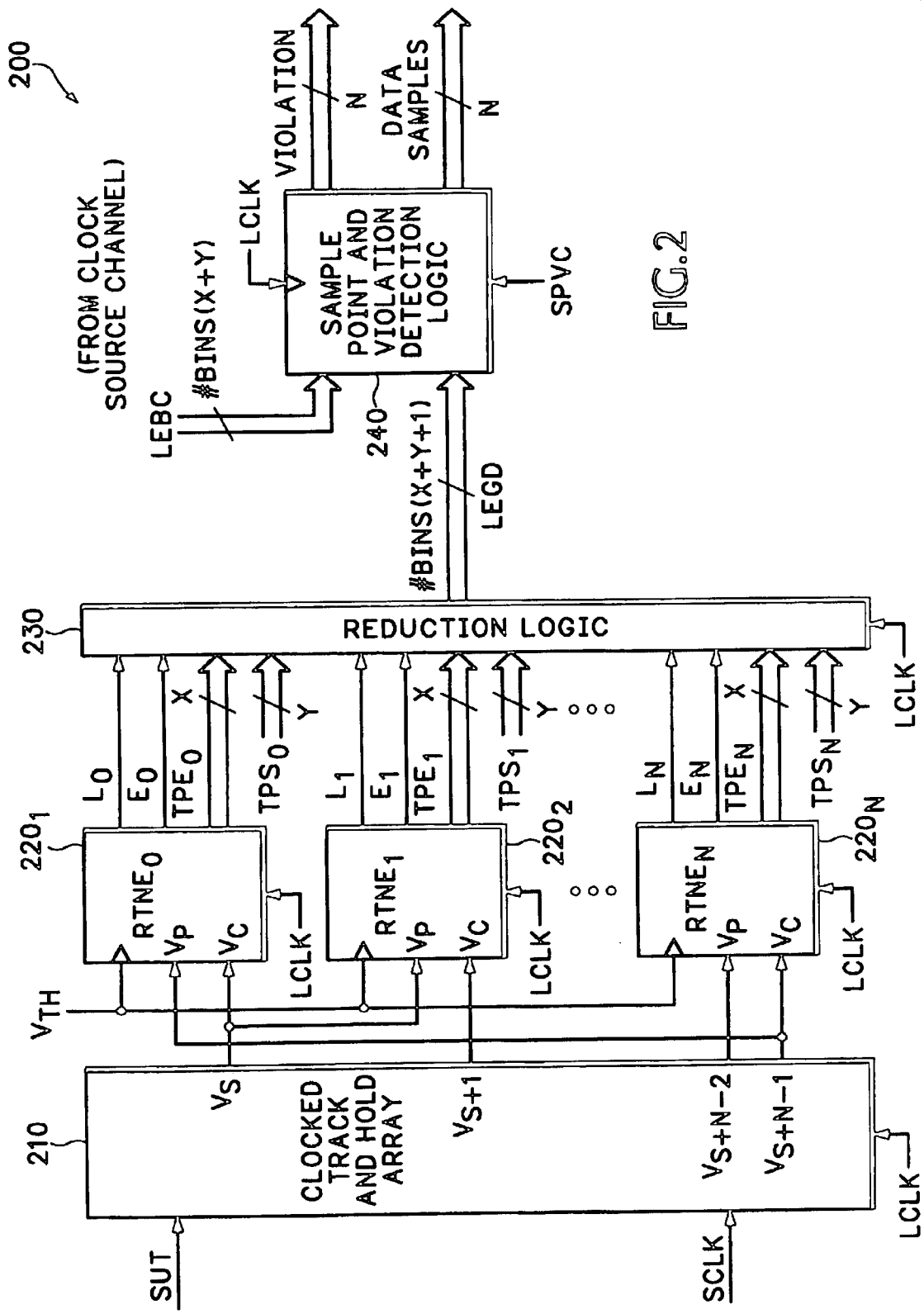
FIG. 2 depicts a high level block diagram of a sample processor suitable for use in the logic analyzer of FIG. 1.

FIG. 2 depicts a high level block diagram of a sample processor suitable for use in the logic analyzer 100 of FIG. 1. Specifically, the sample processor 200 of FIG. 2 comprises a clocked track and hold array 210, a plurality of real-time Nyquist engines (RTNE) $220_1$ through $220_N$ (collectively RTNEs 220), a reduction logic block 230 and a sample point and violation detection logic (SPVDL) block 240.

The clocked track and hold array 210 utilizes, illustratively, the controlled phase-delay sampling techniques described in U.S. patent application Ser. No. 5,521,599 to McCarrol et al., issued May 28,1996 for "High Speed Analog Signal Sampling System," which is incorporated herein by reference in its entirety. Briefly, the clocked track and hold array 210 comprises an array of analog storage cells arranged as, illustratively, a fast-in slow-out (FISO) processing element or other analog processing element functioning in the manner described herein that receives a signal under test (SUT) and a logic clock (LCLK). The array 210 processes the SUT in response to each phase-delayed derivative of LCLK to provide a series of N analog samples to each of a respective sample output to form thereby a set of signal processing "slices." That is, for each clock cycle of LCLK, the array 210 provides a plurality (e.g., N) of analog samples having respective temporal sampling offsets from adjacent analog samples. Each sample is temporally offset from adjacent samples by an amount of time equal to the period of LCLK divided by N. In the embodiment of FIG. 2, the clocked track and hold array 210 provides N samples, denoted as $V_S$ through $V_{S+N-1}$.

The array 210 operates to latch analog samples of the SUT in a sequential manner such that the analog samples may be passed out to the RTNEs 220. The analog samples are rapidly stored in the analog array according to the phase-delayed derivatives of LCLK and clocked out of the array in a relatively slower manner according to the logic clock LCLK. Specifically, the speed at which samples are clocked out of the array is N times slower than the speed at which samples are acquired by the array 210 from the SUT. The samples are depicted in FIG. 2 as being passed out in a parallel manner from the array 210 to the various RTNEs 220. It will be appreciated by those skilled in the art that the samples may also be passed out serially to chains of analog storage cells, to provide on-chip capture of all sequential analog samples that can be digitized at a slower rate, implementing full analog waveform capture at the over-sampled rate.

Using present complementary metal oxide semiconductor (CMOS) technology, the logic clock LCLK may operate at a frequency of approximately 500–600 MHz. The logic clock speed may be increased or decreased depending upon the technology or other requirements of a particular embodiment of the invention. The effective sample rate is equal to the logic clock LCLK multiplied by the number of samples (i.e., N). Thus, assuming a 500 MHz LCLK, and an embodiment using 16 slices (i.e., N=16), the effective sample rate is equal to 8 GHZ.

Each of the RTNEs 220 receives a threshold voltage indicative signal $V_{TH}$, a respective current analog sample $V_C$, a previous analog sample $V_P$ and the logic clock LCLK Specifically, where the array 210 provides N slices, it is noted that the first RTNE $220_0$ receives a first sample $V_S$ as its current sample $V_C$ and the Nth sample $V_{S+N-1}$ from the preceding LCLK cycle as its previous sample $V_P$. Similarly, the second RTNE $220_1$ receives the second sample $V_{S+1}$ as its current sample $V_C$ and the first sample $V_S$ as its previous sample $V_P$. It is noted that the Nth RTNE $220_N$ receives the $V_{S+N-1}$ sample as its current sample $V_C$ and the $V_{S+N-2}$ sample as its previous sample $V_P$. While the RTNEs 220 are depicted as receiving a respective present sample $V_S$ and a single previous sample $V_P$, it will be appreciated by those skilled in the art that more than two previous samples may be processed by each RTNE. Specifically, the inventors contemplate embodiments of the invention wherein each of the RTNEs 220 processes two, three, four or more previous samples (along with the current sample $V_C$) to perform more complex data processing operations on the various slices. An exemplary RTNE will be discussed in more detail below with respect to FIG. 3.

Each of the RTNEs 220 provides the following outputs: a logic output L indicative of the logical value (i.e., 0 or 1) of the current sample $V_C$, a logical value E indicative of the occurrence or non-occurrence of a logical edge between the current $V_C$ and previous $V_P$ samples (i.e., the presence of a logical edge being indicated by a low-high or high-low logical transition between previous $V_P$ and current $V_C$ samples); an X-bit word TPE indicative of the time position of an edge between the previous $V_P$ and current $V_C$ samples and a Y-bit word TPS indicative of the time position or slice number associated with the sample prior (Vp) to the particular sample.

The X-bit time position of edge TPE indicates the interpolated time position of that threshold crossing relative to the time of the two samples. Specifically, the logic within an RTNE 220 performs a Nyquist interpolation to determine where in time between the current sample $V_C$ and the previous sample $V_P$ the threshold crossing between the respective logic levels occurred. In this manner, the RTNE is able to associate relatively accurate timing information with the logic threshold crossing event. Thus, a time stamp indicative of when the logic threshold was crossed may be produced that has a temporally finer resolution than both the logic clock LCLK and the effective sample rate.

Thus, each RTNE 220 provides as its output a list of data comprising a plurality of data structures including the Y-bits to identify its respective slice number, the X-bits to identify its respective estimated or interpolated edge transition time, and its two respective logic bits L and E.

The output data of all N RTNE slices is passed to the reduction logic block 230, which operates to filter out the results from all slices that did not recognize an edge, thereby leaving a shorter list of timing bin values for all the actual edges. Each bin value is the interpolated output of the RTNE slice (X-bits) appended to a static number (Y-bits) representing sample prior (Vp) to the sample it is associated with (i.e., which slice or RTNE the previous sample came from). The bin values in the list represent the precise time of each edge between logic clocks. Since the sample rate is faster than the maximum synchronous clock rate supported (e.g. SCLK=(N)(LCLK)), this list of bins contains less than N items (but may contain more than one). The maximum number of bins in the list that reduction logic block 230 produces and the logic clock rate together determine the maximum synchronous clock rate that can be acquired. The length of the bin list supported by a given implementation can be varied to trade off complexity and overall synchronous speed. A typical implementation is approximately N/2 bins, though more or fewer bins may be used.

Assuming that N=16 and the number of bins=16, X=4 (i.e., the time position of an edge is described as a 4-bit interpolated value between the time position of the current $V_C$ and previous $V_P$ samples), Y=4 (i.e., the number of bits needed to count up to N to identify the specific slice) and using the two logic bits L and E, then the total amount of data entering the reduction logic block 230 from each of the RTNEs 220 is 16×(4+4+2) or 160 bits for each logic clock cycle. The reduction in logic 230 operates to throw out any of the 8-bit sets provided by each RTNE 220 that do not represent an edge transition. It is noted that to recreate the logic signal or make any decisions based upon the logic signal requires only knowledge of where in time the edges or logic transitions of logic signal are. Thus, the reduction logic block 230 operates to discard non-edge-indicative data, while preserving and forwarding edge-indicative data to subsequent processing elements. In this manner, the reduction logic block 230 reduces the sets of data provided by the N RTNEs 220 into less than N edge-indicative sets of data. There might be no edges, one edge or more than one edge indicated in the various sets of data processed by the reduction logic block 230. Only edge-indicative data sets are further propagated.

The reduction logic block 230, for each channel monitoring a data signal, provides as an output at every logic clock a list of data where each entry is X+Y+1 bits long, where the one bit is the logic level of the respective sample, the Y-bits identify the respective slice and the X-bits provide the estimated edge transition time. In one embodiment, the Y-bits representing the slice identification are prepended to the X-bits representing the interpolated time value. Thus, the Y-bits comprise the most significant bits of a time stamp value including the Y-bits, X-bits and the logic bit in the order named.

The reduction logic block 230, for each channel monitoring a clock signal, provides as an output at every logic clock a list of data where each entry is X+Y bits long. As with the data channels, the Y-bits identify the respective slice and the X-bits provide the estimated edge transition time between a current $V_C$ and previous $V_P$ sample. The logic states of the clock channels can be stored just as data channels. Each respective data channel SPVDL 240 also receives as input the list of edge bins LEBC provided by the reduction logic block of the clock channel. The SPVDL block 240 also receives the logic clock signal LCLK and a set of sample point and violation control signals SPVC. The sample point and violation control signals SPVC provide sample point offset and limit description information for sample and hold violations, glitch violations and/or violations of other rules. The SPVC signals also control whether the SPVD logic samples data signals relative to the rising clock edges, falling clock edges, or both (rising and falling) clock edges. The control signals SPVC are provided by, illustratively, a control and display circuitry 150 or other controller (e.g., a controller optionally included within each sample processor 120).

The reduction logic block 230 implements various sequential and combinatorial logic functions as described herein. The actual topologies utilized may be realized using conventional logic design approaches. For each channel the list of edge bins LEBD for that channel and the list of clock edge bins are delivered into a respective block of the sample point and violation detection logic (SPVDL) 240.

The SPVDL block 240 is optionally configured to implement embedded clock recovery on each channel, to sample serial data with the recovered clocks and to de-serialize the sampled data to support the logical acquisition of single-lane or multi-lane serial data as well as parallel bus applications and other variations and combinations of functions.

The SPVDL block 240 provides as an output a single bit DATASAMPLES for each clock bin representing the value of the synchronous data sample associated with that edge. This value is the logical level of the signal compared to the threshold at the point in time represented by the sum of the actual time stamp of the edge and the sample point offset specified by the user. It is noted that the offset may be either positive or negative, thereby representing sample points either before or after clock edge. These values may be selected by a user via, for example, interaction with the control and display circuitry 150.

The SPVDL block 240 optionally provides at an output a single bit VIOLATION for each clock bin representing whether or not a setup-and-hold violation occurred on that data channel within the time window relative to that clock edge specified by the user or whether a glitch occurred between the previous clock edge and the current one. A setup-and-hold violation is detected if the data channel's input crossed the threshold between the time represented by the edge's time stamp minus the setup time specified by the user and the time represented by the edge's time stamp plus the whole time specified by the user. A glitch is detected if the data signal changed states more than once between the previous clock signal edge and the current one.

The reduced list of clock channel bin numbers (LEBC) is stored in the memory 132 within the data acquisition unit 130, along with a time stamp value representing which logic clock they are associated with. The time stamp value is produced by the time stamp processor 135, which is discussed in more detail below with respect to FIG. 4. The individual bin numbers, when appended to this logic clock time stamp, produce an absolute time stamp that has the full resolution of the RTNE interpolation over the full time window of the logic clock time stamp. The total number of bits required to perform this task is (X+Y) (#bins)+(width of logic clock time stamp). For a 16 slice implementation (i.e., N=16) with an 8-bin list of four interpolated bits and a 48-bit logic clock time stamp, this would be (4+4) (8)+48 or 112 bits of time stamp data to store all eight time stamps on each logic clock. The data samples and violation outputs from each SPVDL block 240 are stored in the memory 132 as well. No bin information is stored for SUT channels other than the clock channel.

Figure 3:
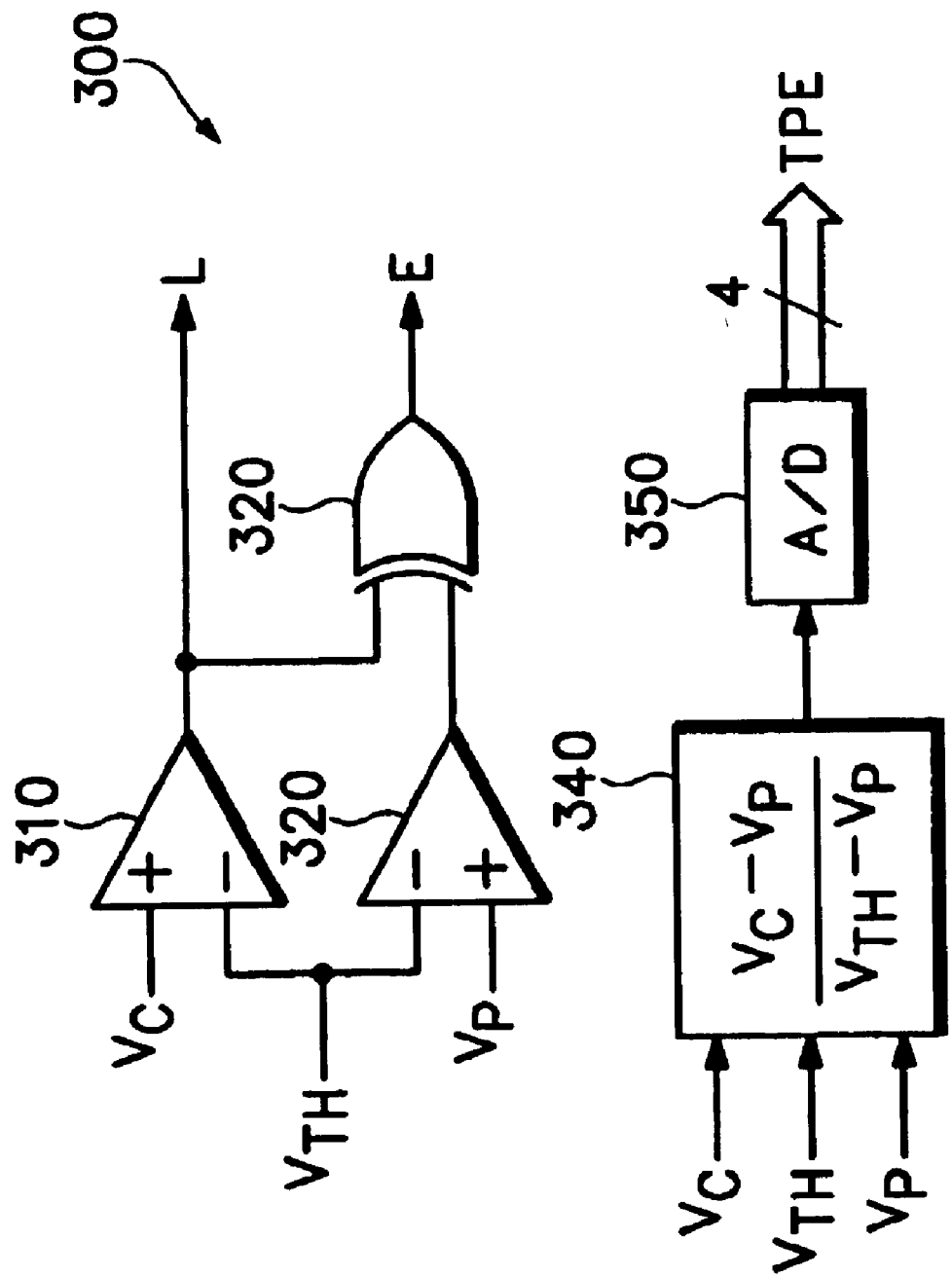
FIG. 3 depicts a high level block diagram of a real-time Nyquist engine (RTNE) suitable for use in the sample processors of FIGS. 1 and 2.

FIG. 3 depicts a high level block diagram of one functional embodiment of a real-time Nyquist engine suitable for use in the sample processors of FIGS. 1 and 2. Specifically, the RTNE 300 of FIG. 3 is suitable for use as an RTNE 220 in the sample processor 200 of FIG. 2. The RTNE 300 of FIG. 3 comprises two voltage comparators 310, 320, an exclusive-or (XOR) gate 330, a signal processing element 340 and an analog-to-digital (A/D) converter 350. The threshold voltage $V_{TH}$ is provided to the inverting inputs of each of the voltage comparators 310, 320. The current sample $V_C$ is provided to the non-inverting input of first voltage comparator 310, the previous sample $V_P$ is provided to the non-inverting input of second voltage comparator 320. The output of first voltage comparator 310 is defined by whether or not $V_C$ is greater than $V_{TH}$, and comprises the logical output L. The outputs of the two voltage comparators 310, 320 are provided to respective inputs of the XOR gate 330, which responsively produces a logical output signal indicative of a difference between the current $V_C$ and previous $V_P$ samples.

Each of the current $V_C$, previous $V_P$ and voltage threshold $V_{TH}$ signals are processed by signal processing element 340, which implements the function $(V_C-V_P)/(V_{th}-V_P)$. The analog output value produced by signal processing element 340 is provided to the A/D converter 350, which responsively produces, illustratively, a 4-bit output word TPE. The 4-bit output word TPE represents an estimation or interpolation of when an edge or logic transition point occurred between the previous $V_P$ and current $V_C$ samples. If $V_P=V_{TH}$, then TPE=0000. If VP≠$V_{TH}$, then TPE represents the approximate point (to 4-bit resolution) between $V_C$ and $V_P$ where the threshold voltage $V_{TH}$ was crossed. This exemplary implementation of an RTNE is based on a simple linear interpolation of the threshold crossing. Optionally, other implementations are used that produce results with greater accuracy over a range of input signal variations (e.g., non-linear interpolation). For any implementation, it is assumed that the analog bandwidth (−3 db frequency) of the input signal path of the logic analyzer is less than half the effective sample rate implemented (a fundamental requirement for the application of Nyquist theory).

Figure 4:
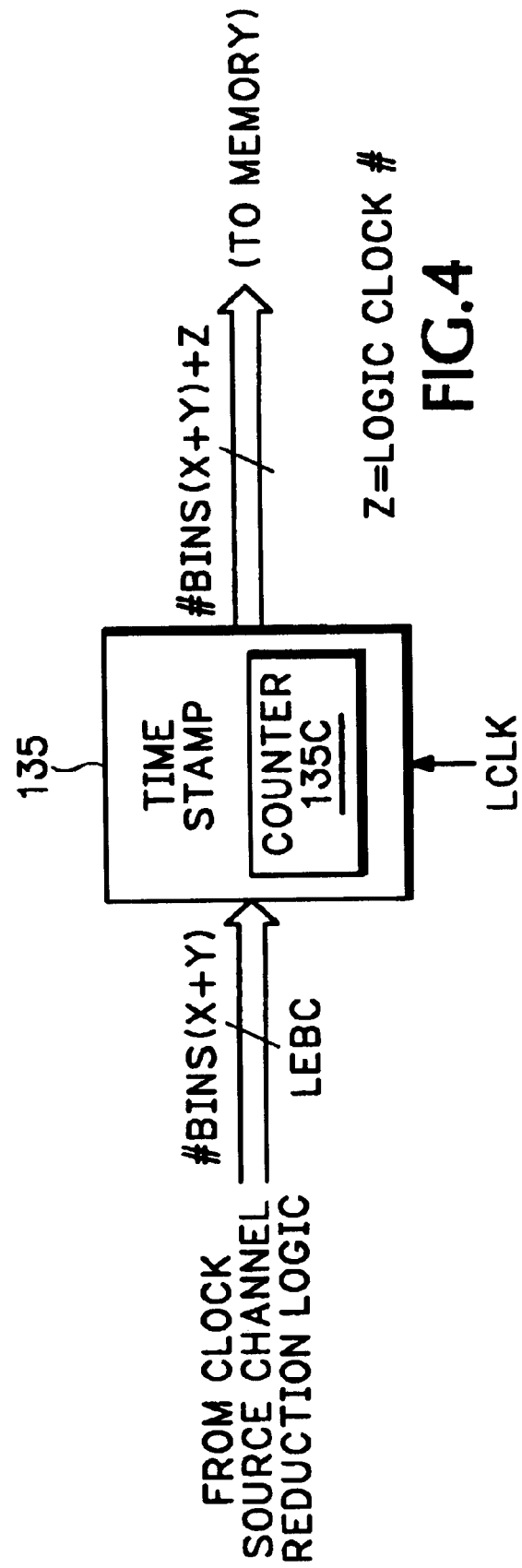
FIG. 4 depicts a high level block diagram of a time stamp processor suitable for use in the logic analyzer of FIG. 1.

FIG. 4 depicts a high level block diagram of a time stamp processor 135 suitable for use in the data acquisition unit 130 of the logic analyzer 100 of FIG. 1. Specifically, the time stamp processor 135 receives the output data produced by a reduction logic block 230 within an input channel monitoring a clock source. The clock source channel produced logic output signal comprises a list of edge bins from the clock channel (LEBC) which comprise a sequence of data structures having a size defined by the number of bins multiplied by (X+Y). The time stamp processor 135 utilizes the logic clock LCLK to increment an internal counter, which count is appended to the LEBC signal received from the clock source channel reduction logic. The output of the time stamp processor 135 is stored within the memory 132 within the data acquisition unit 130. Since the sample processors 120 used to process clock data are synchronized in operation with the sample processors 120 used to process non-clock data, the time stamping of the clock data by the time stamp processor 135 operates to provide a common time stamp for all of the clock and data logic levels received for each logic clock cycle.

Figure 5:
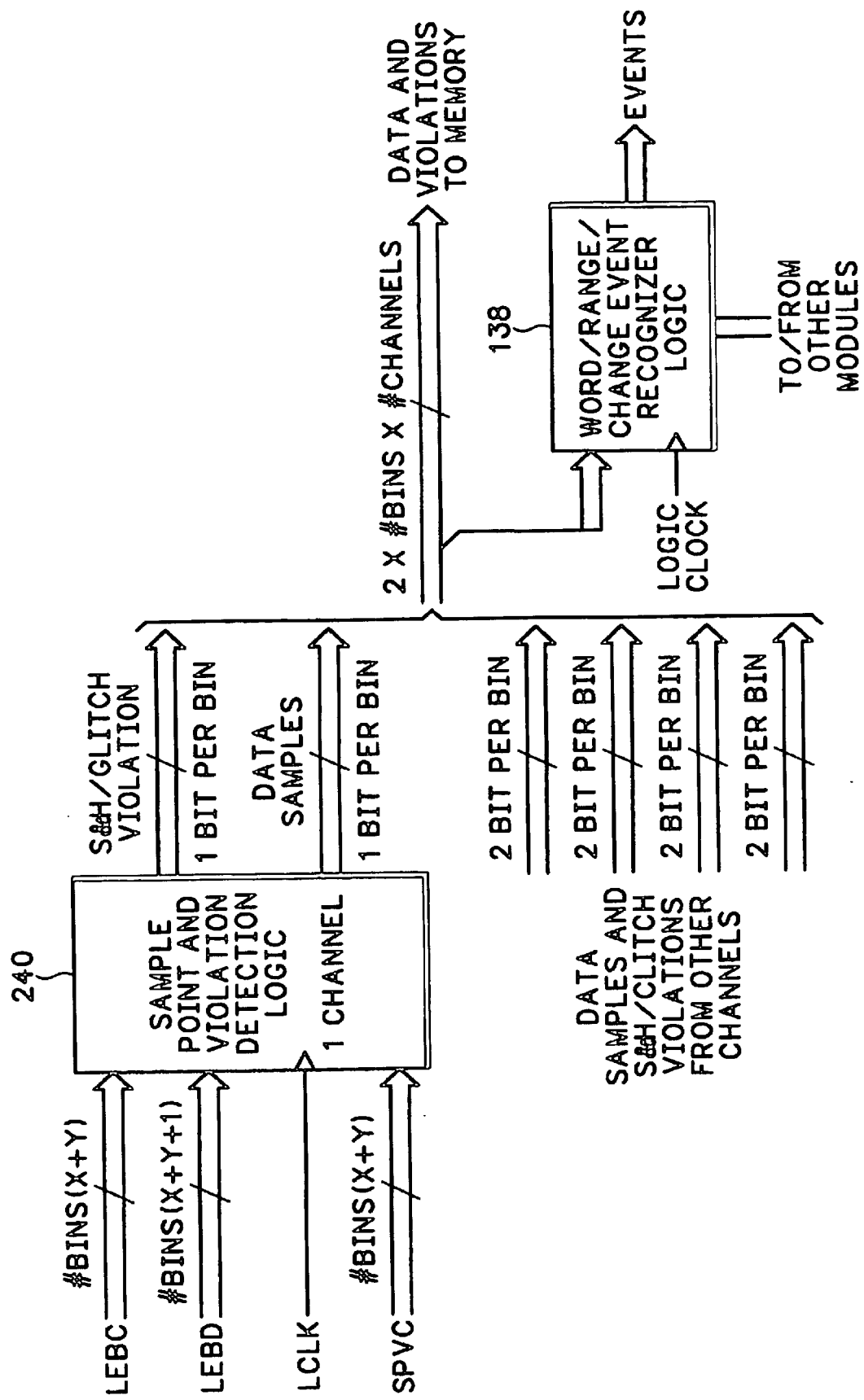
FIG. 5 depicts a high level block diagram useful in understanding the present invention.

FIG. 5 depicts a high level block diagram useful in understanding the relationship between the SPVDL blocks 240 within the sample processors 120 and the event recognition logic 138 within the data acquisition unit 130 of the logic analyzer 100 of FIG. 1. Specifically, as previously discussed with respect to FIG. 2, a respective SPVDL block 240 receives a list of edge bins from a clock channel (LEBC), a list of edge bins and logic values from the respective data channel (LEBD), the logic clock LCLK and sample point and violation control (SPVC) signals SPVC. In response, the SPVDL block produces one bit for each bin indicative of the presence or absence of a sample and hold, glitch or other violation. Additionally, the SPVDL block produces one bit for each bin having a level corresponding to the logic level indicated by the LEBD entry. The evaluation and data information provided by each SPVDL block 240 for each respective channel (e.g., channels 1-M, data channels only) is provided to the event recognition logic 138. The event recognition logic 138 comprises word, range, change, event and other recognition logic. The event recognition logic 138 also receives the logic clock LCLK and responsively produces an output indicative of recognized EVENTS. It is also noted that the event recognition logic 138 may be coupled to or synchronized with event recognition logic within other devices, such as other logic analyzers realized according to the teachings of FIG. 1.

The event logic identifies, illustratively, words (multi-channel values compared to mask bit patterns), ranges (multi-channel data values compared to a range of values), changes (multi-channel data values that have changed from their value on the previous sample) and setup-and-hold violations across multiple channels (a combination of the violation outputs from the prior block). The event recognition logic block 138 optionally implements other types of events and various levels of event combinations, states, and levels of triggering. It is noted that this logic is optionally partitioned into several interconnected integrated circuit (IC) devices and even multiple modules to achieve triggering across an entire set of channels used. Optionally, additional logic is added to implement triggering on serial data and complex protocols.

The event recognition logic block is depicted as part of the data acquisition unit 130 in the logical analyzer 100 of FIG. 1. In other embodiments of the invention, the event recognizer logic block is included within one or more of the sample processors 120.

FIGS. 6–10 depict graphical representations useful in understanding the present invention. Specifically, FIGS. 6–10 will be used to explain the operation of the subject invention within the context of an example. The example implementation comprises a 32 input channel test apparatus operating at a 5 GHz synchronization where the sample rate is 10 giga samples per second (100 picosecond sample period), 16 samples per logic clock (logic clock period equals 1.6 nanoseconds and frequency equals 625 MHz), with 4 bits representing the sample number within the logic clock (the first portion of the bin data). In this example, data will be clocked (sampled) relative to both the rising and falling edges of the clock signal. The edge timing estimation in RTNE slices is resolved to 4 bits (the second portion of the bin data), which provides 6.25 picosecond resolution of edges and time stamps. Up to 8 edge bins are stored per logic clock, where each edge bin comprises an 8-bit value including the sample number plus the edge bin temporal estimation value. In this example, a full time stamp utilizes approximately 112 bits (8 times 8 bins plus approximately 48 bits at the logic clock rate). Data storage requires 8 bits (one per bin) per channel (256 bits for the 32 channels). For the present example, it is assumed that the data sample point of the desired sample occurs 100 picoseconds before the clock edge, such that the sample point bin equals the clock edge bin minus 0001 0000 (a binary value that represents 16 samples at 6.25 ps intervals, or 100 ps).

Figure 6:
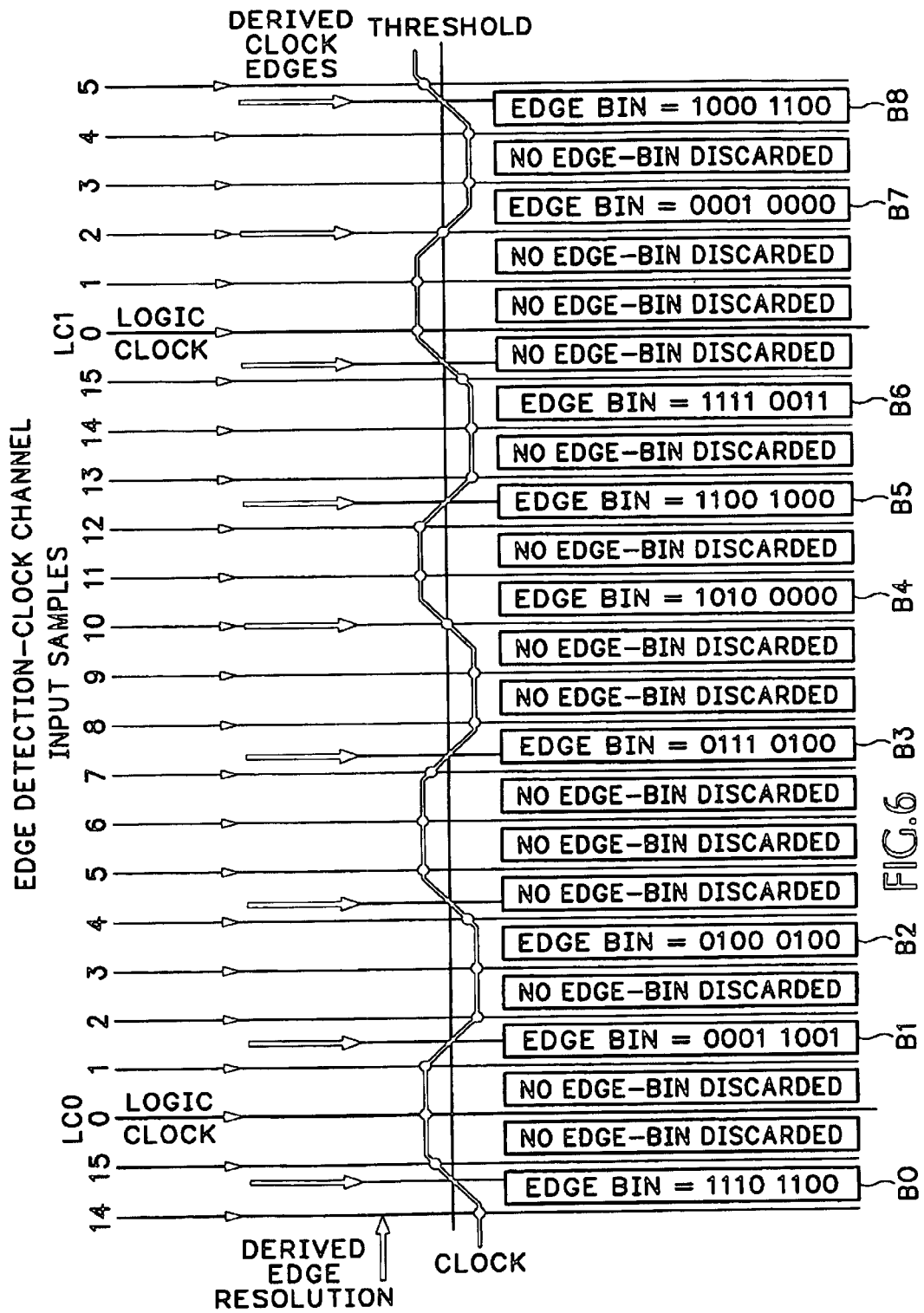

FIG. 6 graphically depicts the operation of the edge detection of a clock channel. Specifically, FIG. 6 depicts the temporal and logical arrangement of detected edge bins with respect to logic clock, sample periods and the like within an input channel used to detect a clock signal. As previously noted, the sample point bin of a desired data sample point is offset by 100 picoseconds in time prior to the clock edge.

Determining the desired sample point will be discussed in more detail below with respect to FIG. 7.

Referring to FIG. 6, a clock signal CLOCK is depicted as traversing in time a plurality of input sample periods defined with respect to two logic clock signals $LC_0$ and $LC_1$. It is noted that the value of the clock signal alternates between values above and below a threshold level THRESHOLD. It is noted that 16 input samples (0–15) are associated with each input sample time period between logic clocks (e.g., $LC_0$, $LC_1$). Some of those sample periods are associated with an edge transition, some of those sample periods are not. Referring to FIG. 6, it is noted that the clock signal CLOCK is at a logical high level at sample period 0, which coincides with logic clock signal $LC_0$. The high logic level exists at each of the sample periods 1, 5, 6, 11 and 12. Similarly, logic low levels of the clock signal CLOCK exist at sample periods 2, 3, 8, 9, 13 and 14. Thus, edge transitions of the clock signal CLOCK occur between sample periods 1 and 2, 3 and 4, 7 and 8, 10 and 11, 12 and 13 and, finally, 14 and 15.

Each of the sample periods in which an edge transition occurs has associated with it an edge bin. Each edge bin is identified with two 4-digit parameters. For example, referring to the edge bin B1 associated with the transition between sample periods 1 and 2, the edge bin B1 is given the binary value of 0001 1001. The 0001 parameter indicates that the transition occurred after the first (and before the second) sample period after the logic clock transition $LC_0$ (i.e., sample period 1). The 1001 parameter of this edge bin indicates that the estimated time between the first and second sample periods of the transition of the clock signal CLOCK through a threshold level THRESHOLD was 9 out of 16 temporal increments between the first and second sample periods. It is noted by inspection that between the first logic clock $LC_0$ and second logic clock $LC_1$ 6 edge bins denoted as bins B1–B6 are shown (along with B0, B7 and B8). Each edge bin indicates which input sample period is associated with the edge transition and approximately where (in time) the transition occurred between the indicated sample period and the next sample period. The value of edge bins B1–B6 is depicted below in Table 1.

TABLE I

| BIN | IDENTIFIER | TEMPORAL OFFSET VALUE |
|-----|------------|-----------------------|
| B0  | 1110       | 1100                  |
| B1  | 0001       | 1001                  |
| B2  | 0100       | 0100                  |
| B3  | 0111       | 0100                  |
| B4  | 1010       | 0000                  |
| B5  | 1100       | 1000                  |
| B6  | 1111       | 0011                  |
| B7  | 0001       | 0000                  |
| B8  | 1000       | 1100                  |

Figure 7:
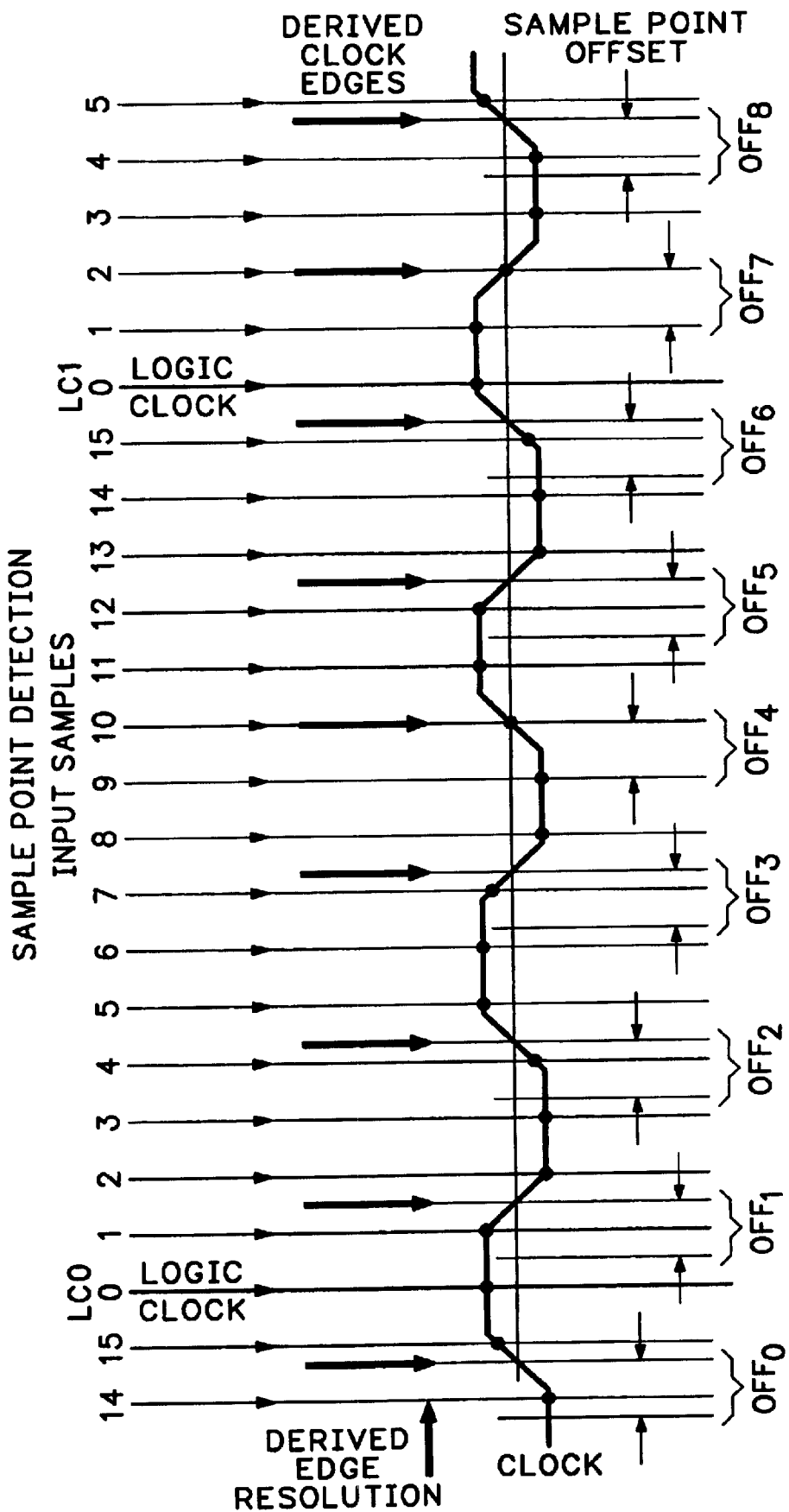

FIG. 7 depicts detection of sampling points as related to the edge detection discussed above with respect to FIG. 6. Specifically, as noted above, the exemplary desired sample point occurs 100 picoseconds before a clock edge such that the desired sample point bin value is equal to the clock edge bin minus 0001 0000. Thus, each of a plurality of offset values $OFF_0$ through $OFF_8$ depicted in FIG. 7 comprise 100 picosecond offsets to derived clock edge transitions.

Figure 8:
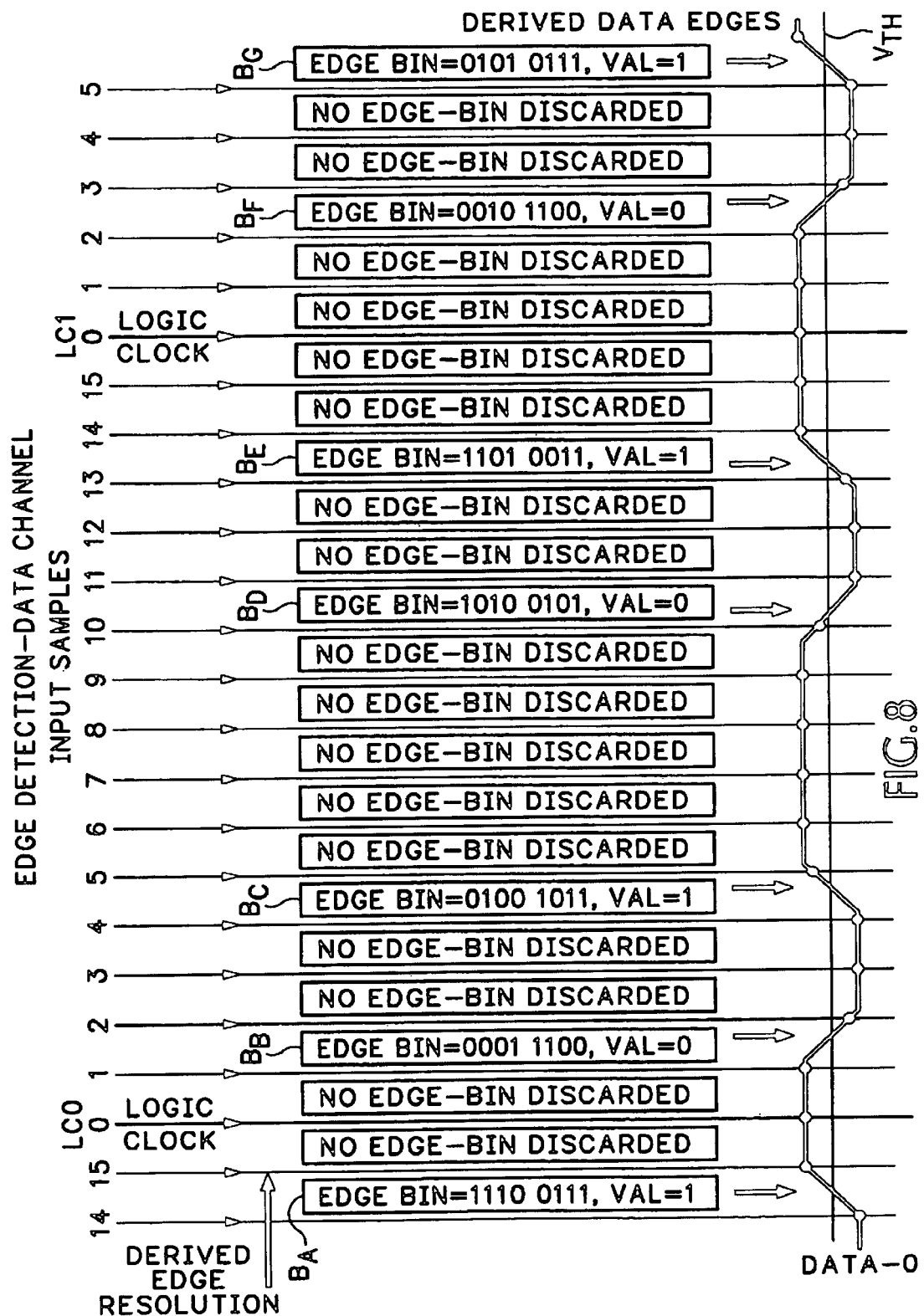

FIG. 8 depicts the detection of edge bins within a data channel. Specifically, a data signal DATA-0 is depicted as transitioning through a threshold level $V_{TH}$ at 7 sample periods. Each of the transitions results in an edge bin generation which includes the edge bin identifier and temporal estimation value such as noted above with respect to the clock channel edge detection discussion of FIG. 6. In addition, the data channel edge bins include a 1-bit value indicative of the logic level of the data signal after the transition point (i.e., 1000). Thus, referring to FIG. 8, it is noted that seven edge bins denoted as $B_A$ through $B_G$ each have associated with them an edge bin value as well as a logic threshold value which are indicated below with respect to Table 2.

TABLE 2

| BIN | IDENTIFIER | TEMPORAL OFFSET VALUE | LOGIC VALUE |
|---|---|---|---|
| $B_A$ | 1110 | 0111 | 1 |
| $B_B$ | 0001 | 1100 | 0 |
| $B_C$ | 0100 | 1011 | 1 |
| $B_D$ | 1010 | 0101 | 0 |
| $B_E$ | 1101 | 0011 | 1 |
| $B_F$ | 0010 | 1100 | 0 |
| $B_G$ | 0101 | 0111 | 1 |

Figure 9:
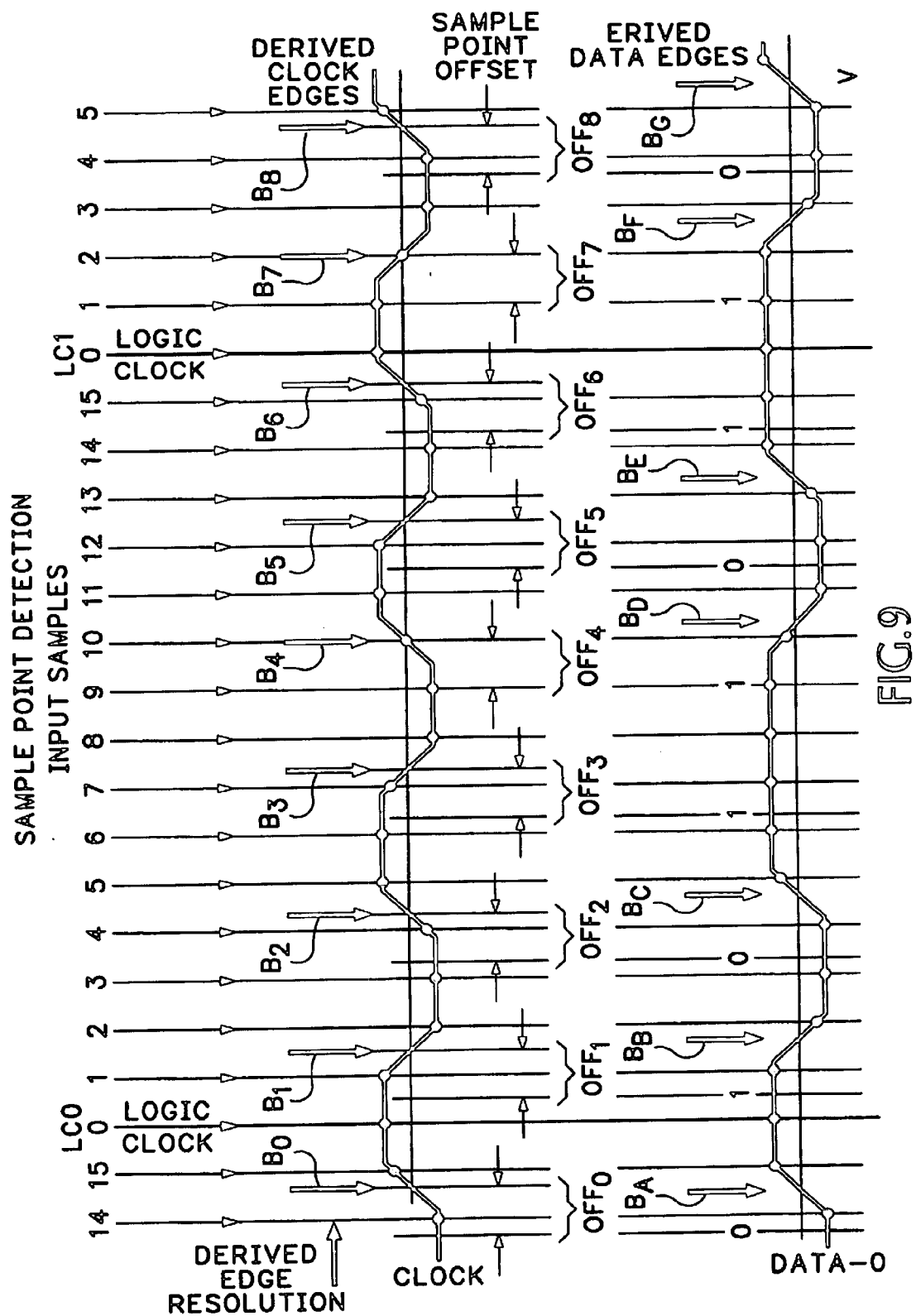

FIG. 9 depicts the relationship between the clock signal CLOCK and data signal DATA-0 discussed above with respect to FIGS. 6–8. Specifically, the detected clock signal edge bins $B_0$ through $B_8$ are depicted along with the clock signal and the offset values $OFF_0$ through $OFF_8$ (all offset values are the same for any given acquisition) This information is aligned with the data signal DATA-0 as well as the data bins $B_A$ through $B_G$. All of these signals, bins and offset values are aligned with the logic clock signals $LC_0$, $LC_1$, and the intervening and surrounding sample periods. The effect of the offset is to change the point in time at which the logic level associated with the data signal is determined. In this example, the data bins provide the logic level associated with each clock edge. By knowing where a sample point is located in relation to a clock edge, and by further knowing the logic value proximate that clock edge, the actual logic value associated with the sample point may be determined.

FIG. 10 depicts the derivation of sample point bin values due to the offset value desired. Specifically, FIG. 10 depicts each of the detected clock edges $B_0$ through $B_8$ where the edge bin identifier (8 bits) is offset or reduced by 0001 0000 to reflect the 100 pico second clock edge offset. The list of clock bins, adjusted by the sample point offset value, is compared logically to (essentially interleaved by sequential value with) the list of data bins for each channel to derive the value of each data channel at the precise time of each sample point. The value of each data signal used is the value of that data channel associated with the data bin whose bin value is closest to, but less than the adjusted bin value of each sample point (the most recent data transition prior to the sample point). Thus, it will appreciated that with respect to FIG. 10, only the sample point data (i.e., the center column) need be stored to provide an accurate representation of the data points acquired at the appropriate sample times.

The above-described invention provides a means of implementing a synchronous (state) acquisition of the logical content of high speed digital bus data and clock signals using multiple signals. Specifically, in various embodiments and imitations according to the invention, the following benefits and/or implementations are provided: (1) an analog oversampling mechanism having an effective sample resolution that is much finer than the maximum logic clock rate at which the circuitry used to implement the mechanism is operated; (2) logic edge detection and clock time stamping with resolution and accuracy much greater than the effective resolution of the sampling mechanism; (3) a means of detecting, time stamping and storing multiple clock edges and the associated synchronous logic samples from all data channels on every clock of the underlying logic; (4) a means of achieving an effective synchronous acquisition clock rate that is many times faster than the maximum clock rate at which the circuitry used to implement it is operated; (5) a means of providing all the following desirable logic analyzer features at the full synchronous acquisition rate of the invention: (a) elimination of the data skew errors inherent in other logic analyzer applications that require the addition of delay elements in the data paths; (b) ability to precisely position the sample point relative to the clock edge with finer resolution than the underlying logic and sampling mechanism; (c) the ability to precisely trigger on glitches or multi-channel violations of setup-and-hold time relative to the clock edge with finer resolution than the underlying logic and sampling mechanism; and (d) complex triggering on combinations of multi-channel word values, range comparisons, data changes and other events derived from the synchronously sampled data; and (6) a means of providing a high-resolution single-shot analog acquisition of all signals in addition to the synchronous data captured, with inherently no time correlation error between the analog samples and synchronous time stamps.

While the foregoing is directed to the preferred embodiment of the present invention, other and further embodiments of the invention may be devised without departing from the basic scope thereof, and the scope thereof is determined by the claims that follow.

What is claimed is:

1. Apparatus, comprising:
   an analog sampling array, for acquiring from a signal under test (SUT) a plurality of temporally offset analog samples during each of a sequence of sample periods;
   a plurality of sample processors equal in number to the plurality of temporally offset analog samples during each of the sequence of samples periods, for identifying logic level transitions between respective current and previous samples of the plurality of temporally offset analog samples and for determining a time of occurrence of said logic level transitions.

2. The apparatus of claim 1, further comprising:
   a time stamp processor, for imparting a time stamp to sample data indicative of respective sample times.

3. The apparatus of claim 1, wherein said samples are acquired and logic level transitions are identified in real time.

4. The apparatus of claim 1, wherein sample intervals are defined as respective temporal portions of a period of a logic clock (LCLK).

5. The apparatus of claim 1, wherein:
   for each sample period, each sample processor receives a respective current sample ($V_C$) and a respective previous sample ($V_P$) and responsively produces sample data comprising indicia of the logic level of the current sample (L), any identified logic level transition between the current and previous samples (E) and an estimated time of occurrence of said identified logic level transition (TPE).

6. The apparatus of claim 5, further comprising:
   reduction logic, for reducing the amount of data provided to said time stamp processor by discarding sample data not associated with an identified logic level transition.

7. The apparatus of claim 6, further wherein:
   sample data produced by each sample processors is associated with a respective slice identifier.

8. The apparatus of claim 1, further comprising:

sample point and violation detection logic (SPVDL) for determining if sample data provided by said sample processors conforms to at least one rule.

9. The apparatus of claim 1, wherein a system comprising a plurality of instances of said apparatus are used to process respective signals under test including at least one clock signal and at least one data signal; and wherein:

a logic event recognizer receives data from said system and responsively produces an indication of the presence of a logic event.

10. A method, comprising:

acquiring a plurality of temporally offset analog samples of a signal under test (SUT) during each of a sequence of sample periods;

determining a logic level for each of said analog samples using a threshold signal level; and generating an edge bin data structure for at least those analog samples having a logic level different from respective immediately preceding analog samples;

each edge bin data structure including identification of a sample associated with said logic level transition and an estimation of the relative threshold level crossing time of the SUT between successive samples.

11. The method of claim 10, wherein an edge bin is generated for each of said temporally offset analog samples of said SUT during each of said sequence of sample periods, said method further comprising:

discarding those edge bins associated with analog samples having the same logic level as respective immediately preceding analog samples.

12. The method of claim 10, wherein:

in the case of a SUT comprising a data signal, said edge bin data structure further includes a logic level indicator.

13. The method of claim 10, wherein:

said edge bin data structure comprises a time stamp indicative of the time of a respective threshold level transition of said SUT within said sample period;

said edge bin data structures adapted to enable thereby mathematical adjustment of temporal data.

14. The method of claim 10, wherein said method is used to process each of a plurality of signals under test including a clock signal and at least one data signal to produce corresponding lists of edge bins, said method further comprising:

processing each data signal edge bin list with said clock signal edge bin list to identify, for each clock signal edge, a corresponding logic value of said data signal.

15. The method of claim 14, further comprising:

processing each data signal edge bin list with said clock signal edge bin list to identify a timing violation.

16. The method of claim 10, wherein:

said a timing violation comprising at least one of a setup-and-hold violation and a glitch.

17. The method of claim 14, further comprising:

examining the logic values of at least a portion of said data signals under test to determine whether a logic event has occurred.

18. The method of claim 17, wherein:

said logic event comprises the occurrence of at least one of a logical word and a change in a logical word.

19. The method of claim 14, further comprising:

in response to a temporal offset command, modifying said clock signal edge bin list to impart thereby a temporal clock edge shift.

20. The method of claim 19, wherein:

said clock signal edge bin list is modified by adjusting each edge bin according to an edge bin value representing an amount of said temporal shift.

21. The method of claim 14, further comprising:

associating each clock signal edge bin with a time stamp derived from a counter incremented according to a logic clock.

* * * * *